(12) United States Patent
Dance et al.

(10) Patent No.: US 7,634,527 B2
(45) Date of Patent: Dec. 15, 2009

(54) RECIPROCAL ESTIMATE COMPUTATION METHODS AND APPARATUS

(75) Inventors: Sherman Matthew Dance, Rochester, MN (US); Andrew Patrick Freemyer, Rochester, MN (US); Matthew Ray Tubbs, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 821 days.

(21) Appl. No.: 11/282,032

(22) Filed: Nov. 17, 2005

(65) Prior Publication Data

US 2007/0112902 A1     May 17, 2007

(51) Int. Cl.
    *G06F 7/38*    (2006.01)
(52) U.S. Cl. ..................................... 708/502
(58) Field of Classification Search .............. 708/502, 708/552
    See application file for complete search history.

(56) References Cited

U.S. PATENT DOCUMENTS 4,594,680 A * 6/1986 Schomburg et al. ......... 708/654
6,163,791 A   12/2000 Schmookler et al.
6,223,192 B1 * 4/2001 Oberman et al. ............ 708/502
6,732,134 B1 * 5/2004 Rosenberg et al. .......... 708/502
2002/0116431 A1 * 8/2002 Ho et al. ..................... 708/502

* cited by examiner

Primary Examiner—Tan V Mai
(74) Attorney, Agent, or Firm—Dugan & Dugan, PC (57) ABSTRACT

In a first aspect, a first method of reciprocal estimate computation using floating point pipeline logic is provided. The first method includes the steps of (1) receiving an input value having an exponent and a mantissa when represented as a floating point number on which a reciprocal estimate computation is to be performed; (2) determining whether the exponent is one of a plurality of predetermined numbers; and (3) if the exponent is one of the plurality of predetermined numbers, adjusting at least one of a plurality of modified mantissa bits (e.g., mantissa bits internal to leading zero anticipator (LZA) logic) and the exponent so as to prevent an underflow result of the reciprocal estimate computation. Numerous other aspects are provided.

21 Claims, 4 Drawing Sheets

RECIPROCAL ESTIMATE COMPUTATION METHODS AND APPARATUS

FIELD OF THE INVENTION

The present invention relates generally to processing units, and more particularly to reciprocal estimate computation methods and apparatus.

BACKGROUND

A reciprocal estimate computation on a large input value may result in a very small number that may not be represented using a normalized floating point format (e.g., a denormal number). Conventional systems of performing a reciprocal estimate computation on such a large input value may require design complexity which causes performance loss. Additionally or alternatively, conventional systems of performing a reciprocal estimate computation on such a large input value may provide inaccurate results. Consequently, improved methods and apparatus for performing a reciprocal estimate computation are desired.

SUMMARY OF THE INVENTION

In a first aspect of the invention, a first method of reciprocal estimate computation using floating point pipeline logic is provided. The first method includes the steps of (1) receiving an input value having an exponent and a mantissa when represented as a floating point number on which a reciprocal estimate computation is to be performed; (2) determining whether the exponent is one of a plurality of predetermined numbers; and (3) if the exponent is one of the plurality of predetermined numbers, adjusting at least one of a plurality of modified mantissa bits (e.g., mantissa bits internal to leading zero anticipator logic (LZA)) and a result exponent based on the exponent so as to prevent an underflow result of the reciprocal estimate computation.

In a second aspect of the invention, a first apparatus for preventing an underflow result of a reciprocal estimate computation is provided. The first apparatus includes (1) exponent detect logic adapted to couple to floating point pipeline logic; (2) underflow prevention logic adapted to couple to the floating point pipeline logic; and (3) exponent adjusting logic adapted to couple to the floating point pipeline logic. The apparatus is adapted to, in response to the floating point pipeline logic receiving an input value having an exponent and a mantissa when represented as a floating point number on which a reciprocal estimate computation is to be performed (a) determine whether the exponent is one of a plurality of predetermined numbers; and (b) if the exponent is one of the plurality of predetermined numbers, adjust at least one of a plurality of modified mantissa bits (e.g., mantissa bits internal to LZA logic) and a result exponent based on the exponent so as to prevent an underflow result of the reciprocal estimate computation.

In a third aspect of the invention, a first system for preventing an underflow result of a reciprocal estimate computation is provided. The first system includes (1) floating point pipeline logic; and (2) an apparatus for preventing an underflow result of a reciprocal estimate computation, coupled to the floating point pipeline logic, and having (a) exponent detect logic; (b) underflow prevention logic; and (c) exponent adjusting logic. The apparatus is adapted to, in response to the floating point pipeline logic receiving an input value having an exponent and a mantissa when represented as a floating point number on which a reciprocal estimate computation is to be performed (i) determine whether the exponent is one of a plurality of predetermined numbers; and (ii) if the exponent is one of the plurality of predetermined numbers, adjust at least one of a plurality of modified mantissa bits (e.g., mantissa bits internal to LZA logic) and a result exponent based on the exponent so as to prevent an underflow result of the reciprocal estimate computation. Numerous other aspects are provided in accordance with these and other aspects of the invention.

Other features and aspects of the present invention will become more fully apparent from the following detailed description, the appended claims and the accompanying drawings.

DETAILED DESCRIPTION

A reciprocal estimate instruction is a microprocessor instruction that may compute an estimate for a value of 1/x, where x is an input value. The fres instruction employed by PowerPC and the vrefp instruction employed by a Power PC VMX are examples of reciprocal estimate instructions. Power PC is manufactured by the assignee of the present methods and apparatus, IBM Corporation of Armonk, N.Y. Such exemplary reciprocal estimate instructions typically may be used by the Newton-Rhapson algorithm and serve as a fast replacement for the floating point divide instruction. The Newton-Rhapson algorithm may be used extensively and may be important for a calculation-intensive software application in which performance is highly-valued. According to IEEE754, a floating point number may be represented as $2^{exponent} \times \text{mantissa}$, where the mantissa may be represented as "implied bit"·"fraction bits". A denormal number may be a number having a biased exponent field of 0 and a non-zero fraction bits field. Using a conventional system, some reciprocal estimate computations may produce a very small number (e.g., a denormal number) which may not be represented as a normal floating point number using an IEEE754 single-precision floating point representation. For example, during a normalization process, the conventional system may shift fraction bits of a floating point number (e.g., to the left) and accordingly reduce an exponent of the floating point number below that allowed by normal IEEE754 representation.

Consequently, the present invention may provide improved reciprocal estimate computation methods and apparatus. More specifically, to compute a reciprocal estimate on a predetermined (e.g., predetermined to be large) input value (which may be represented as $2^{exponent} \times \text{Mantissa}$), the present invention may adjust one of a plurality of mantissa bits, which may already have been modified by multiplier and/or aligner logic of a floating point pipeline and are to be processed by leading zero anticipator logic of the floating-point pipeline such that the mantissa appears larger than it actually is. In this manner, when a shift amount is output from the leading zero anticipator (LZA) logic to normalizing logic, the normalizing logic may not attempt to shift fraction bits of the mantissa too far, and consequently, may not attempt to reduce a result exponent associated with an output value based on the input value past the lower limit of what the floating point representation allows. Therefore, the present invention may avoid an underflow result (e.g., production of a value too small to be represented by a normal floating point number resulting from a large input value). Rather, the normalizing logic may forward the adjusted mantissa bits to the result logic, without having shifted the fraction bits into underflow by decreasing a result exponent based on the exponent associated with the input value past the limit of the floating point standard. Further, the present invention may employ logic to force the exponent associated with the large input value to 0 and output the exponent value to the result logic. Based on such values input by the result logic, the result logic may compute and output an accurate reciprocal estimate for the large input value.

In some embodiments, ORing logic may be employed to force one of the plurality of mantissa bits (e.g., internal to the LZA logic) for adjustment. Selection of an LZA mantissa bit for adjustment may be based on the exponent of the input value.

In at least one embodiment, if logic of the present invention determines the input value is not large enough to result in an underflow, the logic may not adjust mantissa bits (e.g., internal to the LZA logic) and may not force the exponent of the input value to 0 as described above.

In this manner, the present invention may provide improved reciprocal estimate computation methods and apparatus.

Figure 1:
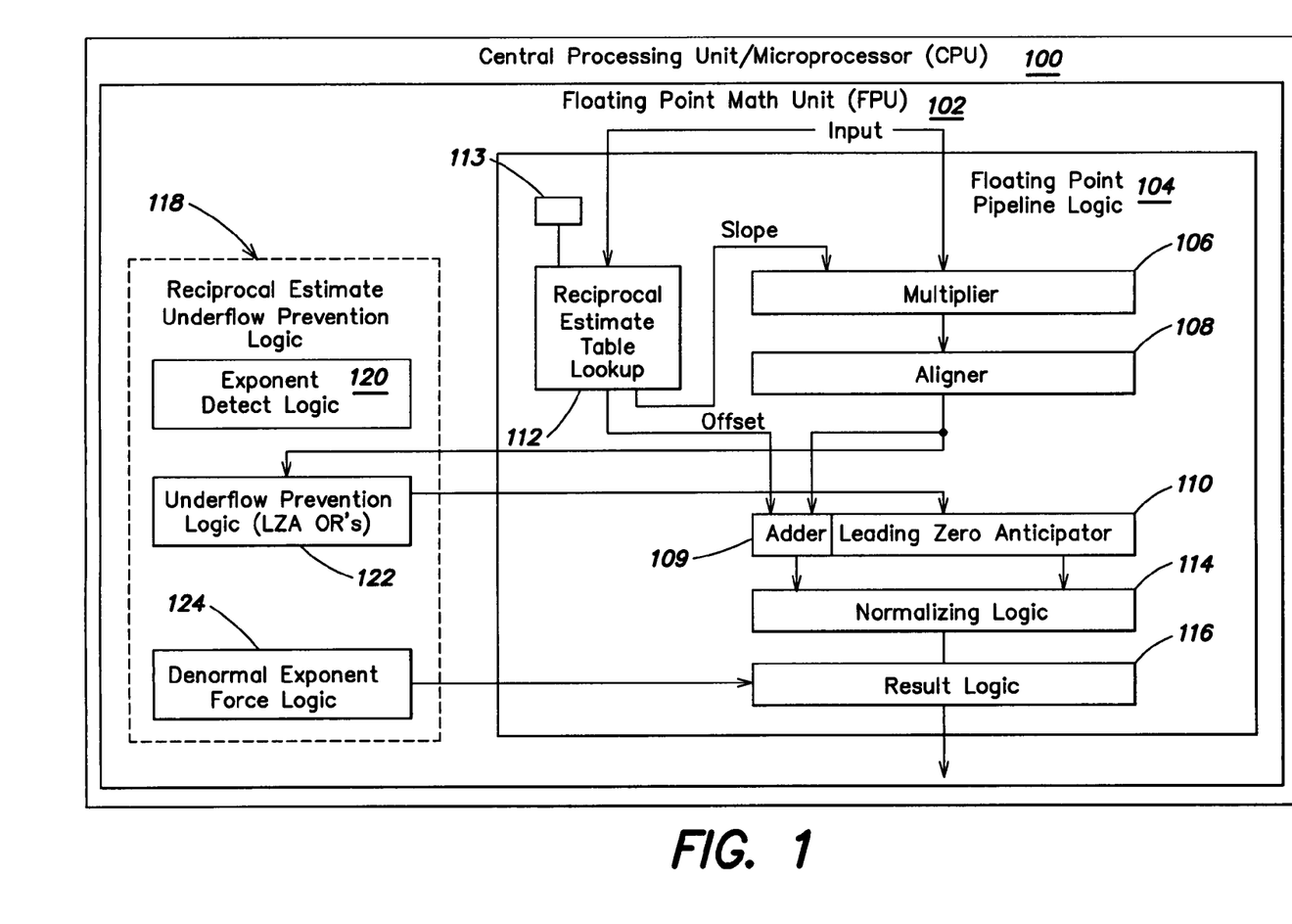
FIG. 1 is a block diagram of a system for reciprocal estimate computation in accordance with an embodiment of the present invention.

FIG. 1 is a block diagram of a system for reciprocal estimate computation in accordance with an embodiment of the present invention. With reference to FIG. 1, the system 100 may include or be a central processing unit (CPU), such as a microprocessor, adapted to perform various data processing and mathematical tasks. In some embodiments, the present invention may be incorporated into the Cell processor manufactured by the assignee of the present invention IBM Corp. of Armonk, N.Y. The CPU 100 may include a floating point math unit (FPU) 102 adapted to perform computation on floating point numbers. Similar to a conventional FPU, the FPU 102 may include floating point pipeline logic 104. The floating point pipeline logic 104 may be adapted to compute a reciprocal estimate on an input value which may be represented as a floating point number. The floating point pipeline logic 104 may include multiplier logic 106 adapted to perform a multiplication operation on the input value. For example, the multiplier logic 106 may be adapted to multiply a fraction portion of the input value with another value, such as a slope value (described below). Aligner logic 108 may be coupled to the multiplier logic 106 and receive input therefrom. The aligner logic 108 may be adapted to shift or align a value input by the aligner logic 108 as desired. For example, the aligner logic 108 (described below) may shift fraction bits of one input to the adder logic 109 based on the difference between the exponents of inputs to such adder logic 109. In this manner, the aligner logic 108 may ensure fraction bits of such inputs to the adder logic 109 are aligned correctly for addition (e.g., such that bit positions of the addends, respectively, have the same significance).

In this manner, the multiplier logic 106 and aligner logic 108 may modify one or more of a plurality of mantissa bits of the input value. The adder logic 109 may be adapted to add values (e.g., two fraction addends) input by the logic 109.

Underflow prevention logic (described below) may be coupled to an output of the aligner logic 108. Leading Zero Anticipator (LZA) logic 110 may be coupled to an output of the underflow prevention logic. The LZA logic 110 may be adapted to determine an amount by which data input by the logic 110 may need to be shifted to normalize the result. For example, the LZA logic 110 may be adapted to anticipate which bit position of the sum will include the most significant bit. Although the adder logic 109 and LZA logic 110 is shown as integrated logic which may operate on data in parallel, it should be understood that in some embodiments the adder logic may be separate from the LZA logic and such logic may operate sequentially.

The floating point pipeline logic 104 may include reciprocal estimate table lookup logic 112 coupled to the multiplier logic 106 and the adder logic 109. The reciprocal estimate table lookup logic 112 may be adapted to receive the input value as data, access data from a reciprocal estimate table 113 and output a first portion of such data (e.g., a slope value) to the multiplier logic 106 and a second portion of such data (e.g., an offset value) to the adder logic 109. The slope and offset values may be used in conjunction with the input value to allow the multiply-add logic to perform linear interpolation to produce a reasonably accurate estimate of the reciprocal function.

Further, normalizing logic 114 may be coupled to an output of the adder logic 109 and LZA logic 110. The normalizing logic 114 may be adapted to shift bits of the mantissa (e.g., to the left) and reduce the exponent associated with the input value accordingly. For example, the normalizing logic 114 may shift mantissa fraction bits such that the most significant bit in a normal floating point number may be in the standard implied bit position. Result logic 116 may be coupled to the normalizing logic 114. The result logic 116 may be adapted to force some special case results, such as infinity, zero, not a number, etc. In some embodiments, the result logic may include rounding logic adapted to perform rounding operation. The result of the reciprocal estimate computation on the input value may be output from the result logic 116.

However, in contrast to a conventional FPU, the FPU 102 may include logic 118 adapted to prevent an underflow result for a reciprocal estimate computation. Such reciprocal estimate underflow prevention logic 118 may include exponent detect logic 120 coupled to the floating point pipeline logic 104. The exponent detect logic 120 may be adapted to determine whether the exponent of the input value is one of a plurality of predetermined (e.g., large) numbers. For example, the exponent detect logic 120 may determine whether the exponent associated with the input value is 126 or 127 (although the exponent detect logic 120 may determine whether the exponent is one of a larger or smaller amount of numbers and/or different numbers). When the exponent of the input value is one of these large numbers, the result of the reciprocal estimate computation may be a denormal number, some of which may not be represented using a normal floating point number pursuant to IEEE754.

Further, reciprocal estimate underflow prevention logic 118 may include underflow prevention logic 122 coupled to the floating point pipeline logic 104. The underflow prevention logic 122 may be adapted to adjust one of a plurality of bits to be processed or processed by the LZA logic 110. More specifically, the underflow prevention logic 122 may be adapted to adjust one of a first or second bit to the left of a most significant bit of a plurality of mantissa fraction bits (e.g., previously modified by the multiplier and/or aligner logic 106, 108) which may be internal to the LZA logic 110. Additionally, the reciprocal estimate underflow prevention logic 118 may include exponent force logic 124 adapted to adjust the exponent of an output value based on the input value when such exponent is one of a plurality of large numbers. For example, when an exponent (e.g., unbiased) of an input value is 126 or 127, the exponent force logic 122 may adjust the output value exponent field to zero. In this manner, the reciprocal estimate underflow prevention logic 118 may be adapted to prevent the normalizing logic 114 of the floating point pipeline logic 104 from shifting mantissa fraction bits too far, and reducing an exponent accordingly, so as to cause an underflow result of the reciprocal estimate computation. In this manner, the FPU 102 may produce an estimate of the function 1/input value within a certain accuracy range.

Figure 2:
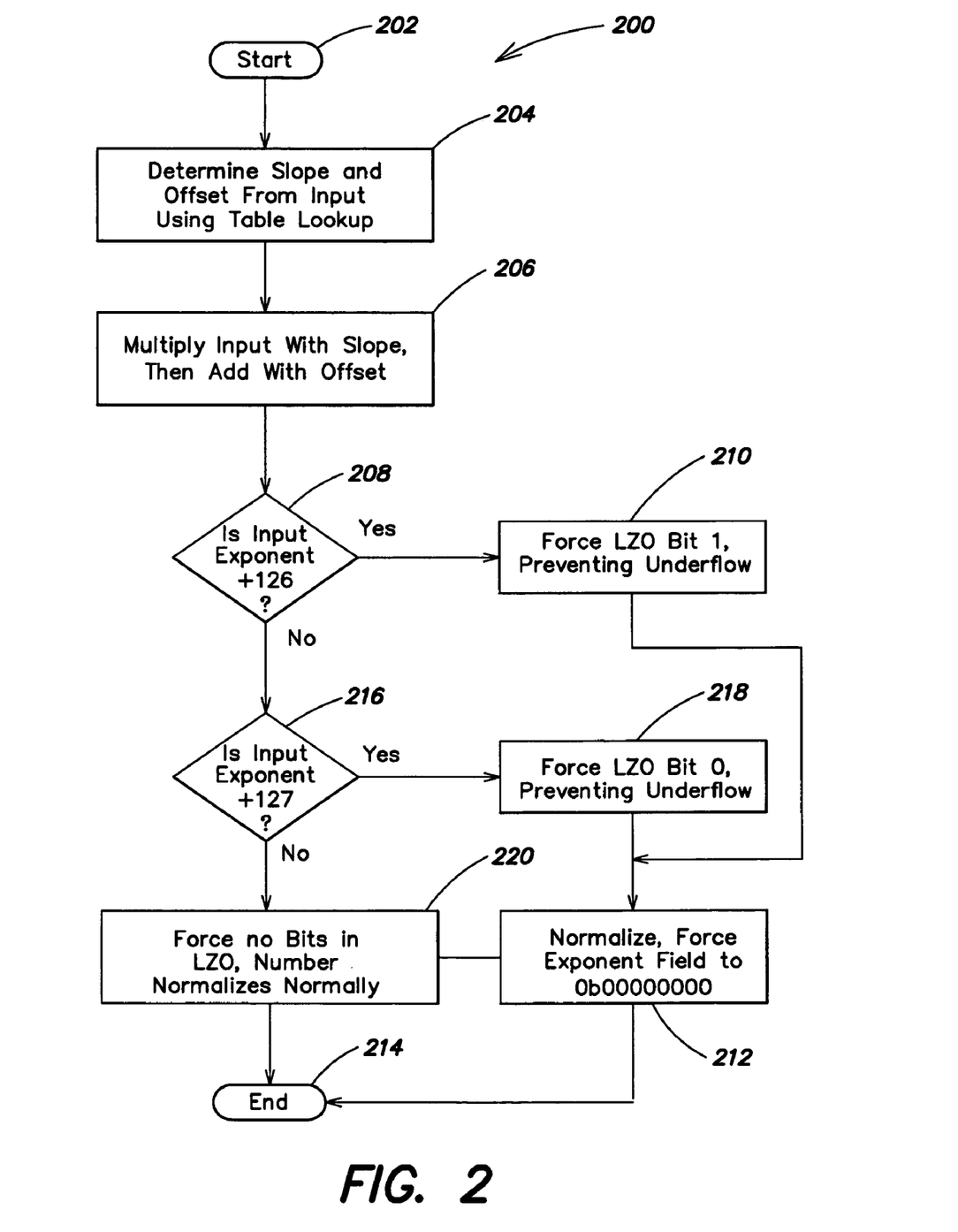
FIG. 2 illustrates a flowchart of a reciprocal estimate computation method performed by the system in accordance with an embodiment of the present invention.

The reciprocal estimate underflow prevention logic 118 may be implemented, for example, via combinational, and/or sequential logic or as an application specific integrated circuit (ASIC). Operation of the system 100 for reciprocal estimation computation is described below with reference to FIG. 1 and with reference to FIG. 2 which illustrates a flowchart of a reciprocal estimate computation method performed by the system 100 in accordance with an embodiment of the present invention. With reference to FIG. 2, in step 202, the method 200 begins. The floating point pipeline logic 104 may receive an input value on which a reciprocal estimate computation is to be performed. The input value may be represented pursuant to IEEE754 as a single-precision floating point number including an exponent and a mantissa. More specifically, the input value may be provided to multiplier logic 106 and reciprocal estimate table lookup logic 112. In response, in step 204, a value of a slope and an offset associated with the input value may be determined by performing a table lookup. More specifically, the reciprocal estimate table lookup logic 112 may access the reciprocal estimate table 113 based on the input value to determine the slope and offset.

In step 206, portions of the input value may be multiplied by the slope and added with the offset. More specifically, the slope may be provided to the multiplier logic 106, and the multiplier logic 106 may multiply portions of the input value by the slope and output the resultant value to the aligner logic 108. The aligner logic 108 may shift the resultant value to the left or right as necessary. In this manner, the floating point pipeline logic 104 may modify one or more of a plurality of mantissa fraction bits of the input value to yield an aligned value. The aligned value may be output to the adder logic 109. The adder logic 109 may process the aligned value. More specifically, the adder logic 109 may add the offset provided by the reciprocal estimate table lookup logic 112 to the aligned value.

In step 208, the reciprocal estimate underflow prevention logic 118 may determine whether the exponent associated with the input value is a first value. More specifically, the exponent detect logic 120 may determine whether the exponent associated with the input value is a first value which may be large enough to cause a conventional FPU to output an underflow result. For example, the exponent detect logic 120 may determine whether the exponent associated with the input value is 126 (e.g., using compare logic). If so, step 210 may be performed. In step 210, the underflow prevention logic 122 may adjust at least one bit of the aligned value that will be sent to the LZA logic 110 to yield a modified aligned value. More specifically, the underflow prevention logic 122 may adjust one of the plurality of modified mantissa fraction bits of the aligned value included in (or to be sent to) the LZA logic 110 such that an underflow result of the reciprocal estimate may be avoided. For example, a first bit to the left of (e.g., the first bit position to the left of) a most significant fraction bit of the modified mantissa bits may be adjusted if the exponent is of a first value. In this manner, based on the modified aligned value is provided to the LZA logic 110 for processing, the reciprocal estimate underflow prevention logic 118 may cause the LZA logic 110 to determine little or no shifting is required of the modified aligned value to compute the reciprocal estimate of the input value. The LZA logic 110 may provide information about whether shifting is required of the modified aligned value to the normalizing logic 114. The underflow prevention logic 122 may include logic, such as ORing logic, to adjust such bit (e.g., from a logic "0" to a logic "1" or vice versa).

Thereafter, step 212 may be performed. In step 212, the modified aligned value may be normalized and the exponent associated with input value may be adjusted. More specifically, the normalizing logic 114 may receive the modified aligned value and the shifting information and adjust the value such that a logic "1" may be in an implied bit position of the mantissa. The normalized value may be output from the normalizing logic 114 and provided to the result logic for processing. The result logic 116 may force some special case results, such as infinity, zero, not a number, etc. Further, the reciprocal estimate underflow prevention logic 118 may adjust the exponent associated with an output value based on the input value. More specifically, the exponent force logic 124 may adjust an exponent field associated with the output value to a binary 0 (0b00000000 for single precision floating point). In this manner, the FPU 102 may perform a reciprocal estimate on an input value, which may be sufficiently large enough to cause a reciprocal estimate underflow result using a conventional FPU, and output a denormal number. The denormal number resulting from the reciprocal estimate calculation performed by the present methods and apparatus may be very close to an actual reciprocal calculation of the input value. Details of the accuracy of a reciprocal estimate produced by the present methods and apparatus are described below.

Thereafter, step 214 may be performed. In step 214, the method 200 ends.

Alternatively, if in step 208, the reciprocal estimate underflow prevention logic 118 determines the exponent associated with the input value is not the first value, step 216 may be performed. In step 216, the reciprocal estimate underflow prevention logic 118 may determine whether the exponent associated with the input value is a second value. More specifically, the exponent detect logic 120 may determine whether the exponent associated with the input value is a second value which may be large enough to cause a conventional FPU 102 to output an underflow result. For example, the exponent detect logic 120 may determine whether the exponent associated with the input value is 127 (e.g., using compare logic). If so, step 218 may be performed. In step 218, the underflow prevention logic 122 may adjust at least one bit of the aligned value to yield a modified aligned value. More specifically, the underflow prevention logic 122 may adjust one of the plurality of modified mantissa fraction bits (e.g., that may be internal to the LZA logic 110) included in the resultant value such that an underflow result of the reciprocal estimate may be avoided. For example, a second bit to the left of (e.g., two bit positions to the left of) a most significant fraction bit of the modified mantissa bits may be adjusted if the exponent is of the second value. In this manner, based on the modified aligned value is provided to the LZA logic 110 for processing, the reciprocal estimate underflow prevention logic 118 may cause the LZA logic 110 to determine little or no shifting is required of the modified aligned value to compute the reciprocal estimate of the input value. The LZA logic 110 may provide information about whether shifting is required of the modified aligned value to the normalizing logic 114. The underflow prevention logic 122 may include logic, such as ORing logic, to adjust such bit (e.g., from a logic "0" to a logic "1" or vice versa).

Thereafter, steps 212 and 214 (as described above) may be performed. As stated, in step 214, the method 200 ends.

Alternatively, if in step 216, the reciprocal estimate underflow prevention logic 118 determines the exponent associated with the input value is not the second value, step 220 may be performed. In step 220, the reciprocal estimate underflow prevention logic 118 may not adjust the aligned value and may not adjust the exponent associated with the input value when computing the reciprocal estimate of the input value. More specifically, because the FPU 102 determines the exponent associated with the input value is not the first and/or second value, the input value is not large enough to cause an underflow of a reciprocal estimate computation. Therefore, the multiplier logic 106, aligner logic 108, adder logic 109, LZA logic 110, normalizing logic 114 and result logic 116 of the FPU 102 may process the input value in a manner similar to that of a conventional FPU and output such result.

Thereafter, step 214 may be performed. In step 214, the method ends.

Through use of the present method of computing a reciprocal estimate, a reciprocal estimate on an input value may produce a reasonably accurate denormal result. One of a plurality of bits (e.g., mantissa fraction bits) processed by adder logic and/or LZA logic may be adjusted such that the plurality of bits may be moved into respective bit positions that produce an accurate denormal result and such that normalizing logic 114 of the present apparatus does not cause an underflow result of the reciprocal estimate computation.

Figure 3:
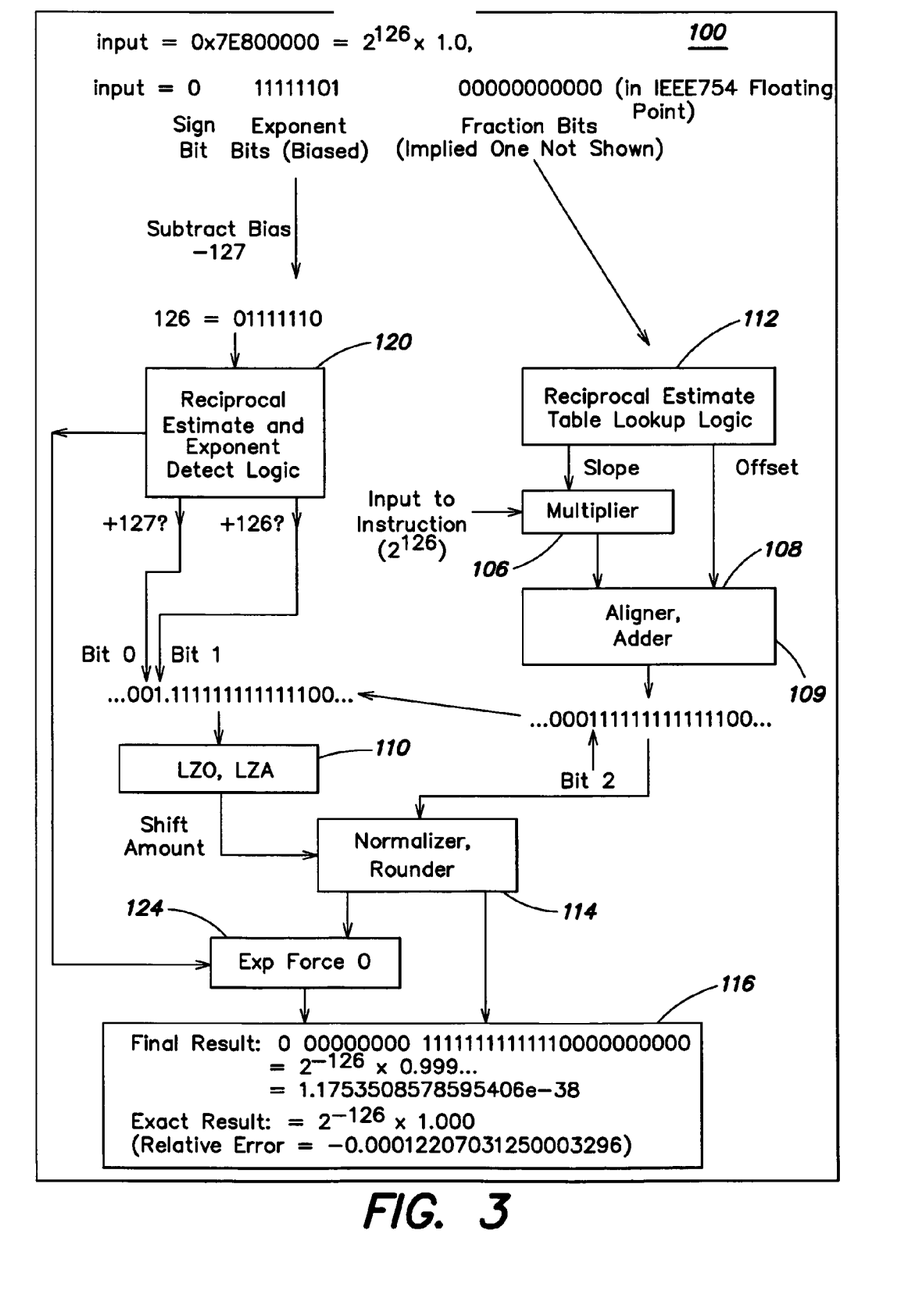
FIG. 3 illustrates a first exemplary reciprocal estimate computation performed by the system in accordance with an embodiment of the present invention.

FIG. 3 illustrates a first exemplary reciprocal estimate computation performed by the system 100 in accordance with an embodiment of the present invention. With reference to FIG. 3, the system 100 may receive 0x7E800000 (e.g., 8.5070591730234616e+37) as input. Such hexadecimal value may be represented as the single-precision floating point number having an exponent and a mantissa including an implied bit and fraction bits (e.g., as $2^{exponent} \times$ "implied bit"."fraction bits"), $2^{126} \times 1.0$. The hexadecimal value may be represented as 01111111010000000000000000000000 in binary, where 11111101 represents the biased exponent and 00000000000000000000000 represents the fractions bits of the mantissa. The fraction bits may be input by the reciprocal estimate table lookup logic 112 which may output a slope and an offset value based on the input fraction bits. More specifically, the slope may be output from the reciprocal estimate table lookup logic 112 and input by the multiplier logic 106. Further, the offset may be output from the reciprocal estimate table lookup logic 112 and input by the adder logic 109.

The exponent portion (e.g., $2^{exponent}$) of the single-precision floating point number may also be provided to the multiplier logic 106 as input. Based on such inputs, the multiplier logic 106 may multiply portions of the input value (e.g., the fraction bits) by the slope to yield a resultant value. The resultant value may be output from the multiplier 106 and input by the aligner logic 108. The aligner logic 108 may shift the resultant value to the left or right as necessary, thereby modifying one or more of a plurality of mantissa fraction bits of the input value to yield an aligned value.

The aligned value may be output from the aligner logic 108 and input by adder logic 109. The adder logic 109 may add the aligned value with the offset value to yield an added value. As shown, a first through third bit (e.g., bits 0-2) of the added value may be "001", where bit 2 may represent the most significant fraction bit of the added value. The aligned value may be output from the aligner logic 108 and input by the LZA logic 110 (e.g., via underflow prevention logic) for processing.

However, while logic of the floating point pipeline logic 104 computes the added value, the exponent may be input by the exponent detect logic 120 which may determine whether the exponent associated with the input value is sufficiently high enough so as to possibly cause a reciprocal estimate of a conventional FPU to result in an overflow value. More specifically, the exponent detect logic 120 may determine whether the exponent associated with the input value is a first or second value (e.g., 126 or 127). The exponent detect logic 120 may provide such finding to the exponent force logic 124.

In the first exemplary reciprocal estimate computation, the exponent detect logic 120 determines the exponent associated with the input value is the first value (e.g., 126). Therefore, the underflow prevention logic 122 may adjust a bit (e.g., bit 1) to the left of the most significant fraction bit of the added value from a logic "0" to a logic "1" to yield a modified added value. For example, the fraction bits of the modified added value may be 11111111111110000000000. The modified added value may be input to the LZA logic 110 for processing. The modified added value may appear to the LZA logic 110 as requiring little or no shifting, and accordingly, little or no reduction of the exponent value. The LZA logic 110 may output the required shift amount to the normalizing logic 114.

Based on the shift amount and the added value, the normalizing logic 114 may output a normalized version of the added value which may be input by the result logic 116. Further, based on the output from the exponent detect logic 120, the exponent force logic 124 may adjust the exponent associated with the input value to yield an adjusted exponent value, which may be output from the exponent force logic and input by the result logic 116. The adjusted exponent value field may be 0, which represents the exponent –126. Based on the normalized version of the added value and the adjusted exponent value, the result logic forces some special case results, such as infinity, zero, not a number, etc., if necessary, and output a reciprocal estimate of the input value. For example, for a sufficiently large input value such as $2^{126} \times 1.0$, which may cause a conventional FPU reciprocal estimate computation to result in an underflow, the system 100 may compute a reciprocal estimate of 1.1753508578595406e–38. The relative error of the reciprocal estimate computation compared to the actual or exact result of $2^{-126} \times 1.0$ (e.g., 1.1754943508222875e–38) is –0.00012207031250003296 with an absolute error of –1.4349296274690001e–42. The absolute error is the difference between the actual and estimated values.

Figure 4:
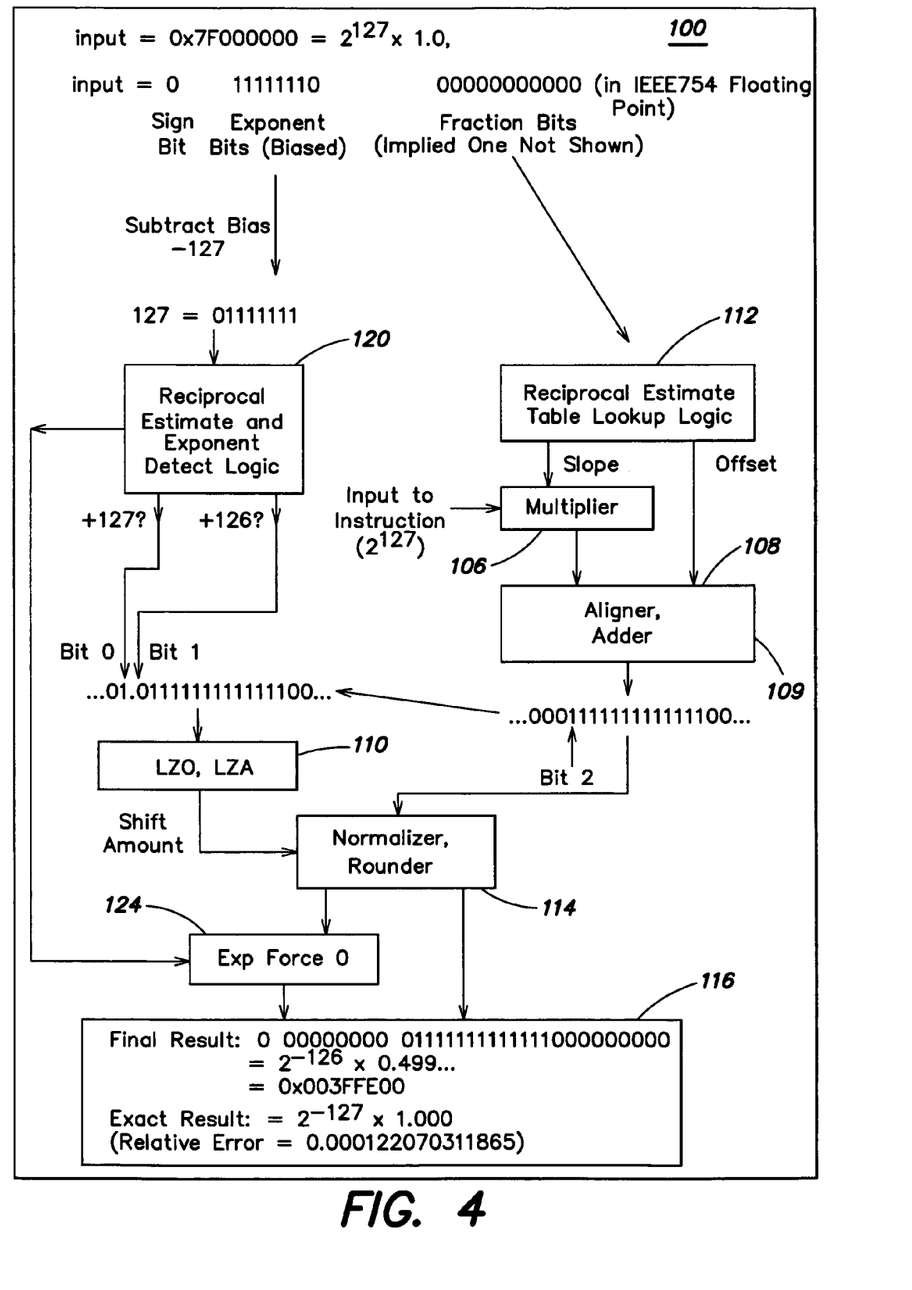
FIG. 4 illustrates a second exemplary reciprocal estimate computation performed by the system in accordance with an embodiment of the present invention.

FIG. 4 illustrates a second exemplary reciprocal estimate computation performed by the system in accordance with an embodiment of the present invention. With reference to FIG. 4, the system 100 may receive 0x7F000000 as input. Such hexadecimal value may be represented as the single-precision floating point number $2^{127} \times 1.0$. The hexadecimal value may be represented as 01111111100000000000000000000000 in binary, where 11111110 represents the biased exponent and 00000000000000000000000 represents the fraction bits of the mantissa. The fraction bits may be input by the reciprocal estimate table lookup logic 112 which may output a slope and an offset value based on the input fraction bits. More specifically, the slope may be output from the reciprocal estimate table lookup logic 112 and input by the multiplier logic 106. Further, the offset may be output from the reciprocal estimate table lookup logic 112 and input by the adder logic 109.

As stated, the exponent portion (e.g., $2^{exponent}$) of the single-precision floating point number may also be provided to the multiplier logic 106 as input. Based on such inputs, the multiplier logic 106 may multiply portions of the input value (e.g., the fraction bits) by the slope to yield a resultant value. The resultant value may be output from the multiplier 106 and input by the aligner logic 108. The aligner logic 108 may shift the resultant value to the left or right as necessary, thereby modifying one or more of a plurality of mantissa fraction bits of the input value to yield an aligned value. The aligned value may be output from the aligner logic 108 and input by adder logic 109. The adder logic 109 may add the aligned value with the offset value to yield an added value. As shown, a first through third bit (e.g., bits 0-2) of the added value may be "001", where bit 2 may represent the most significant fraction bit of the added value. The aligned value may be output from the aligner logic 108 and input by the LZA logic 110 (e.g., via underflow prevention logic) for processing.

Further, while logic of the floating point pipeline logic 104 computes the added value, the exponent may be input by the exponent detect logic 120 which may determine whether the exponent associated with the input value is sufficiently high enough so as to possibly cause a reciprocal estimate of a conventional FPU to result in an underflow value. More specifically, the exponent detect logic 120 may determine whether the exponent associated with the input value is a first or second value (e.g., 126 or 127). The exponent detect logic 120 may provide such finding to the exponent force logic 124.

In the second exemplary reciprocal estimate computation, the exponent detect logic 120 determines the exponent associated with the input value is the second value (e.g., 127), the underflow prevention logic 122 may adjust a bit (e.g., bit 0) to the left of the most significant fraction bit of the added value from a logic "0" to a logic "1" to yield a modified added value. For example, the fraction bits of the modified added value may be 01111111111111000000000. The modified added value may be input to the LZA logic 110 for processing. The modified added value may appear to the LZA logic 110 as requiring little or no shifting, and accordingly, little or no reduction of the exponent value. The LZA logic 110 may output the required shift amount to the normalizing logic 114.

Based on the shift amount and the added value, the normalizing logic 114 may output a normalized version of the added value which may be input by the result logic 116. Further, based on the output from the exponent detect logic 120, the exponent force logic 124 may adjust the exponent associated with the input value to yield an adjusted exponent value, which may be output from the exponent force logic 124 and input by the result logic 116. The adjusted exponent value may be 0 biased, −126 unbiased. Based on the normalized version of the added value and the adjusted exponent value, the result logic 116 may compute a reciprocal estimate of the input value. For example, for a sufficiently large input value such as $2^{127} \times 1.0$, which may cause a conventional FPU reciprocal estimate computation to result in an underflow, the system 100 may compute reciprocal estimate of 0x003FFE00. The relative error of the reciprocal estimate computation compared to the exact result of $2^{127} \times 1.0$ is 0.000122070311865.

As further examples, reciprocal estimate simulation results achieved by the present methods and apparatus follow:
Input: 7E83FFFE=8.7729027439394844e+37
Result: 007C1CF0=1.1397982342614628e−38
Actual: 007C1F04=1.1398736241188435e−38
RelErr: −6.6138785726337532e−05
AbsErr: −7.5389857380699995e−43
Input: 7E81FFFF=8.639980958481473e+37
Result: 007E0D70=1.157609298262417e−38
Actual: 007E07E1=1.1564098934909436e−38
RelErr: 0.00017228535248818512
AbsErr: 1.9940477147339999e−42

As illustrated by the first and second exemplary reciprocal estimate computations, relatively minimal control logic (e.g., the reciprocal estimate underflow prevention logic 118) may be coupled to and/or included in the floating point pipeline logic 104. The control logic may be employed to essentially "fool" normalizing logic 114 into thinking that a mantissa associated with an input value on which a reciprocal estimate is to be performed may not need to be shifted. Logic (e.g., ORing logic) may be employed to adjust one of a plurality (e.g., two) bits processed by the LZA logic 110 based on a value of an exponent (e.g., 126 or 127) associated with the input value. Because the normalizing logic 114 is "fooled" in this manner, the normalizing logic 114 may not normalize the input value so as to cause an underflow result. Consequently, mantissa fraction bits may be positioned properly to yield an accurate denormal number result of the reciprocal estimate computation. Only one of the plurality of bits may need to be adjusted (e.g., forced) because of the nature of the reciprocal function and limitations of the single-precision floating point representation. In this manner, leading zero or (LZA ORs) logic may be employed to help a reciprocal estimate instruction produce a denormal result.

As illustrated with reference to FIG. 3, if an unbiased exponent of a first value (e.g., 126) is associated with an input value, then a first bit (e.g., bit 1) of a plurality of bits processed by the LZA logic 110 (e.g., LZA edge detection logic) may be adjusted such that when the normalizing logic 114 normalizes the plurality of bits (e.g., modified mantissa fraction bits), bit 2 of the plurality of bits will be the most significant fraction bit of the normalized plurality of bits. Further, the exponent field associated with the input value may be forced to zero before being input by the result logic 116. Additionally, the reciprocal estimate table 113 may be adapted to bias the offset associated with the input value having a mantissa with a zero fractional bit field to a mantissa employed for the estimate which has fraction bits 0b0.1111111111111 (e.g., slightly less than 0b1.0). In this manner, estimate accuracy may be improved by biasing estimates downward so that an error amount may be balanced between a positive and negative value.

As shown above, when an exponent of 126 and mantissa of 1.0 are associated with a reciprocal estimate computation input value, an un-normalized result for mantissa bits of 0b0.1111111111111 may be achieved after a table lookup, multiply and add operation. The leading one on the left is in bit position 2 (e.g., bit 2). Consequently, the underflow prevention logic 122 may adjust (e.g., force) bit 1 of the result before (or during) processing by the LZA logic 110. Therefore, the normalizing logic 114 may normalize such result so that the leading one (e.g., formerly bit 2) is the most significant fraction bit of the normalized result. Further, the exponent force logic 124 may adjust the exponent to zero. Consequently, the result of the reciprocal estimate computation is 0x007FFC00 (e.g., $2^{-126} \times$0b0.1111111111111. As described above such result may be very close to an actual result of $2^{126} \times 1.0$.

In a similar manner, as illustrated with reference to FIG. 4, when an exponent of 127 is associated with an input value, the underflow prevention logic 122 may adjust bit 0 of an un-normalized result for mantissa bits and adjust the exponent to zero.

Differentiating between which bit position to adjust may allow relative accuracy to be maintained for denormal reciprocal estimation computation result similar to that for a reciprocal estimation computation result in the normal range. In contrast, if only one bit position may be adjusted regardless of the exponent (e.g., 126 or 127) associated with an input value on which a reciprocal estimate may be performed, a relative accuracy for a reciprocal estimate on an input value associated with an exponent of 127 may be lower.

The foregoing description discloses only exemplary embodiments of the invention. Modifications of the above disclosed apparatus and methods which fall within the scope of the invention will be readily apparent to those of ordinary skill in the art. For instance, although the present methods and apparatus may have been described above with reference to single-precision floating point numbers (e.g., a 32-bit number), the present invention also includes methods and apparatus for performing a reciprocal estimate on a double-precision floating point number (e.g., a 64-bit number). In one embodiment, this invention may be implemented in the PowerPC™ VMX™ instruction "vrefp" on the Cell™ microprocessor architecture. Reciprocal estimate instructions typically may be used by the Newton-Rhapson algorithm and serve as a fast replacement for the floating point divide instruction. The Newton-Rhapson algorithm may be used extensively in calculation-intensive software applications such as graphical and scientific applications in which performance is highly valued.

Accordingly, while the present invention has been disclosed in connection with exemplary embodiments thereof, it should be understood that other embodiments may fall within the spirit and scope of the invention, as defined by the following claims.

The invention claimed is:

1. A method of reciprocal estimate computation using floating point pipeline logic of an apparatus to prevent an underflow result of a reciprocal estimate computation, comprising:
   receiving via the floating point pipeline logic an input value having an exponent and a mantissa when represented as a floating point number on which a reciprocal estimate computation is to be performed;
   determining whether the exponent is one of a plurality of predetermined numbers; and
   if the exponent is one of the plurality of predetermined numbers, adjusting at least one of a plurality of modified mantissa bits and a result exponent based on the exponent so as to prevent an underflow result of the reciprocal estimate computation.

2. The reciprocal estimate computation method of claim 1 further comprising, if the exponent is not one of the plurality of predetermined numbers, employing the floating point pipeline logic to compute a reciprocal estimate of the input value without adjusting at least one of the plurality of modified mantissa bits and the result exponent based on the exponent so as to prevent an underflow result of the reciprocal estimate computation.

3. The reciprocal estimate computation method of claim 1 wherein adjusting at least one of the plurality of modified mantissa bits so as to prevent an underflow result of the reciprocal estimate computation includes reducing an amount of modified mantissa bit shifting performed by normalizing logic of the floating point pipeline logic.

4. The reciprocal estimate computation method of claim 3 wherein reducing an amount of modified mantissa bit shifting performed by normalizing logic of the floating point pipeline logic includes eliminating an amount of modified mantissa bit shifting required to be performed by the normalizing logic of the floating point pipeline logic.

5. The reciprocal estimate computation method of claim 1 wherein adjusting the result exponent based on the exponent so as to prevent an underflow result of the reciprocal estimate computation includes adjusting the result exponent based on the exponent to zero.

6. The reciprocal estimate computation method of claim 1 wherein adjusting at least one of the plurality of modified mantissa bits includes adjusting a first bit to the left of a most significant fraction bit of the modified mantissa bits if the exponent is of a first value.

7. The reciprocal estimate computation method of claim 1 wherein adjusting at least one of the plurality of modified mantissa bits includes adjusting a second bit to the left of a most significant fraction bit of the modified mantissa bits if the exponent is of a second value.

8. An apparatus for preventing an underflow result of a reciprocal estimate computation, comprising:
   exponent detect logic adapted to couple to floating point pipeline logic;
   underflow prevention logic adapted to couple to the floating point pipeline logic; and
   exponent adjusting logic adapted to couple to the floating point pipeline logic;
   wherein the apparatus is adapted to, in response to the floating point pipeline logic receiving an input value having an exponent and a mantissa when represented as a floating point number on which a reciprocal estimate computation is to be performed:
      determine whether the exponent is one of a plurality of predetermined numbers; and
      if the exponent is one of a plurality of predetermined numbers, adjust at least one of the plurality of modified mantissa bits and a result exponent based on the exponent so as to prevent an underflow result of the reciprocal estimate computation.

9. The apparatus of claim 8 wherein the apparatus is further adapted to, if the exponent is not one of the plurality of predetermined numbers, employ the floating point pipeline logic to compute a reciprocal estimate of the input value without adjusting at least one of the plurality of modified mantissa bits and the result exponent based on the exponent so as to prevent an underflow result of the reciprocal estimate computation.

10. The apparatus of claim 8 wherein the apparatus is further adapted to reduce an amount of modified mantissa bit shifting performed by normalizing logic of the floating point pipeline logic.

11. The apparatus of claim 10 wherein the apparatus is further adapted to eliminate an amount of modified mantissa bit shifting required to be performed by the normalizing logic of the floating point pipeline logic.

12. The apparatus of claim 8 wherein the apparatus is further adapted to adjust the result exponent based on the exponent to zero.

13. The apparatus of claim 8 wherein the apparatus is further adapted to adjust a first bit to the left of a most significant fraction bit of the modified mantissa bits if the exponent is of a first value.

14. The apparatus of claim 8 wherein the apparatus is further adapted to adjust a second bit to the left of a most significant fraction bit of the modified mantissa bits if the exponent is of a second value.

15. A system for preventing an underflow result of a reciprocal estimate computation, comprising:
   floating point pipeline logic; and
   an apparatus for preventing an underflow result of a reciprocal estimate computation, coupled to the floating point pipeline logic, and having:
      exponent detect logic;

underflow prevention logic; and
exponent adjusting logic;
wherein the apparatus is adapted to, in response to the floating point pipeline logic receiving an input value having an exponent and a mantissa when represented as a floating point number on which a reciprocal estimate computation is to be performed:
 determine whether the exponent is one of a plurality of predetermined numbers; and
 if the exponent is one of the plurality of predetermined numbers, adjust at least one of a plurality of modified mantissa bits and a result exponent based on the exponent so as to prevent an underflow result of the reciprocal estimate computation.

16. The system of claim 15 wherein the apparatus is further adapted to, if the exponent is not one of the plurality of predetermined numbers, employ the floating point pipeline logic to compute a reciprocal estimate of the input value without adjusting at least one of the plurality of modified mantissa bits and the result exponent based on the exponent so as to prevent an underflow result of the reciprocal estimate computation.

17. The system of claim 15 wherein the apparatus is further adapted to reduce an amount of modified mantissa bit shifting performed by normalizing logic of the floating point pipeline logic.

18. The system of claim 17 wherein the apparatus is further adapted to eliminate an amount of modified mantissa bit shifting required to be performed by the normalizing logic of the floating point pipeline logic.

19. The system of claim 15 wherein the apparatus is further adapted to adjust the result exponent based on the exponent to zero.

20. The system of claim 15 wherein the apparatus is further adapted to adjust a first bit to the left of a most significant fraction bit of the modified mantissa bits if the exponent is of a first value.

21. The system of claim 15 wherein the apparatus is further adapted to adjust a second bit to the left of a most significant fraction bit of the modified mantissa bits if the exponent is of a second value.

* * * * *

UNITED STATES PATENT AND TRADEMARK OFFICE
CERTIFICATE OF CORRECTION

PATENT NO.        : 7,634,527 B2                                    Page 1 of 1
APPLICATION NO.   : 11/282032
DATED             : December 15, 2009
INVENTOR(S)       : Dance et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1063 days.

Signed and Sealed this

Ninth Day of November, 2010

David J. Kappos
*Director of the United States Patent and Trademark Office*